(12) United States Patent
Iijima et al.

(10) Patent No.: US 9,547,126 B2
(45) Date of Patent: Jan. 17, 2017

(54) OPTICAL WAVEGUIDE SHEET, OPTICAL UNIT, AND METHOD FOR MANUFACTURING THE SAME

(71) Applicant: FUJITSU LIMITED, Kawasaki-shi, Kanagawa (JP)

(72) Inventors: Sanae Iijima, Nagano (JP); Takashi Kubota, Chikuma (JP); Norio Kainuma, Nagano (JP); Hidehiko Kira, Nagano (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/674,007

(22) Filed: Mar. 31, 2015

(65) Prior Publication Data

US 2015/0362675 A1    Dec. 17, 2015

(30) Foreign Application Priority Data

Jun. 17, 2014  (JP) ................. 2014-124657

(51) Int. Cl.
*G02B 6/10*     (2006.01)
*G02B 6/12*     (2006.01)
*G02B 6/122*    (2006.01)
*G02B 6/43*     (2006.01)
*G02B 6/138*    (2006.01)

(52) U.S. Cl.
CPC .............. *G02B 6/1221* (2013.01); *G02B 6/43* (2013.01); *G02B 6/138* (2013.01); *G02B 2006/12104* (2013.01); *Y10T 156/1064* (2015.01)

(58) Field of Classification Search
CPC ........ G02B 6/122; G02B 6/12004; G02B 6/13
USPC ................... 385/14, 131; 156/257
See application file for complete search history.

(56) References Cited

U.S. PATENT DOCUMENTS

| | | | |
|---|---|---|---|
| 2002/0085786 A1* | 7/2002 | Kikuchi | G02B 6/12002 385/14 |
| 2008/0069494 A1* | 3/2008 | Oggioni | G02B 6/43 385/14 |
| 2012/0219251 A1 | 8/2012 | Kuroda et al. | |

FOREIGN PATENT DOCUMENTS

| | | |
|---|---|---|
| JP | 2011-85647 | 4/2011 |
| JP | 2013-195462 | 9/2013 |

* cited by examiner

*Primary Examiner* — Jerry Blevins
(74) *Attorney, Agent, or Firm* — Staas & Halsey LLP

(57) ABSTRACT

An optical waveguide sheet, includes: an optical path; and a clad member that covers the optical path, wherein the clad member has a portion formed by removing a part of the clad member which is on a first surface of an optical waveguide sheet on which the optical component is to be mounted and is provided within an area which is unused for propagation of light input to and output from the optical component.

18 Claims, 19 Drawing Sheets

OPTICAL WAVEGUIDE SHEET, OPTICAL UNIT, AND METHOD FOR MANUFACTURING THE SAME

CROSS-REFERENCE TO RELATED APPLICATION

This application is based upon and claims the benefit of priority of the prior Japanese Patent Application No. 2014-124657, filed on Jun. 17, 2014, the entire contents of which are incorporated herein by reference.

FIELD

The embodiments discussed herein are related to an optical waveguide sheet, an optical unit, and a method for manufacturing an optical unit.

BACKGROUND

An optical unit is formed by attaching optical components such a lens and an optical element to an optical waveguide sheet with respect to the position of a mirror formed in advance on an optical path in the optical waveguide sheet.

A related technology is disclosed in Japanese Laid-open Patent Publication No. 2011-85647 or Japanese Laid-open Patent Publication No. 2013-195462.

SUMMARY

According to an aspect of the embodiments, an optical waveguide sheet, includes: an optical path; and a clad member that covers the optical path, wherein the clad member has a portion formed by removing a part of the clad member which is on a first surface of an optical waveguide sheet on which the optical component is to be mounted and is provided within an area which is unused for propagation of light input to and output from the optical component.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In a case of an optical unit including an optical axis conversion mirror on an optical wave guide substrate, for example, a barycentric position on an outline of a core unit of the optical axis conversion is first determined, and then an alignment recess is formed at a position determined based on the barycentric position. Positioning of a light emitting and receiving element with respect to the optical axis conversion mirror is performed based on the alignment recess.

For example, a guide core pattern juxtaposed to an optical signal transmission core pattern is provided with an alignment guide hole which is exposed to one side of an optical waveguide, and is used to position an optical fiber connector by fitting a protrusion of the optical fiber connector or the like into the alignment guide hole.

In a method for manufacturing an optical unit, it is difficult to accurately align the position of an optical component such as a lens or the like to the position of a mirror formed in advance. This might deteriorate mounting accuracy of an optical module on an optical waveguide sheet.

In the method for manufacturing an optical unit, in the process of mounting an optical component on an optical waveguide sheet on which a mirror is formed in advance, the mirror might be deformed because load and heat for mounting are applied to the mirror, for example. Therefore, loss of optical coupling between the mirror and the optical component mounted on the optical waveguide sheet may occur.

When the mirror is used as an alignment reference for a light emitting and receiving element with respect to the optical axis conversion mirror, loss of optical coupling might occur due to deformation of the mirror. An alignment guide hole, into which a protrusion of an optical fiber connector or the like as a positioning target is to be fitted, might not to be adequate for use as to adjust the relative positions of optical components provided in an optical path.

Figure 1:
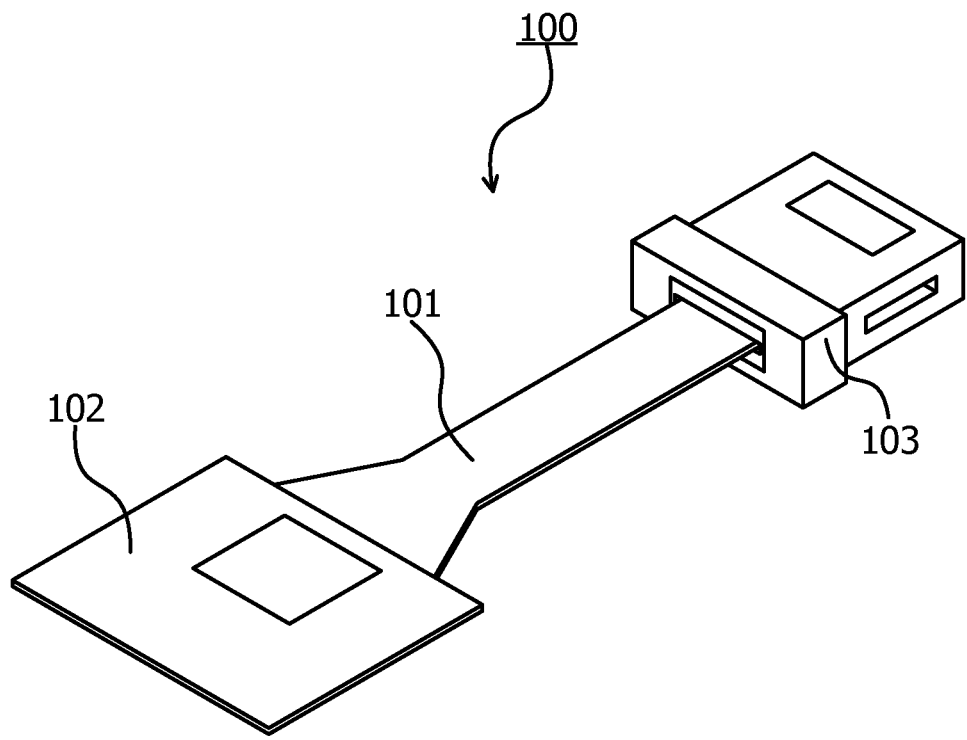
FIG. 1 illustrates an example of an optical unit.

FIG. 1 illustrates an example of an optical unit. In FIG. 1, an optical unit 100 includes an optical waveguide sheet 101 and an optical module 102. The optical waveguide sheet 101 has a sheet shape like a long scale. The optical module 102 is provided on a first face of the optical waveguide sheet 101 and in the vicinity of one end in the length direction of the optical waveguide sheet 101.

Figure 8:
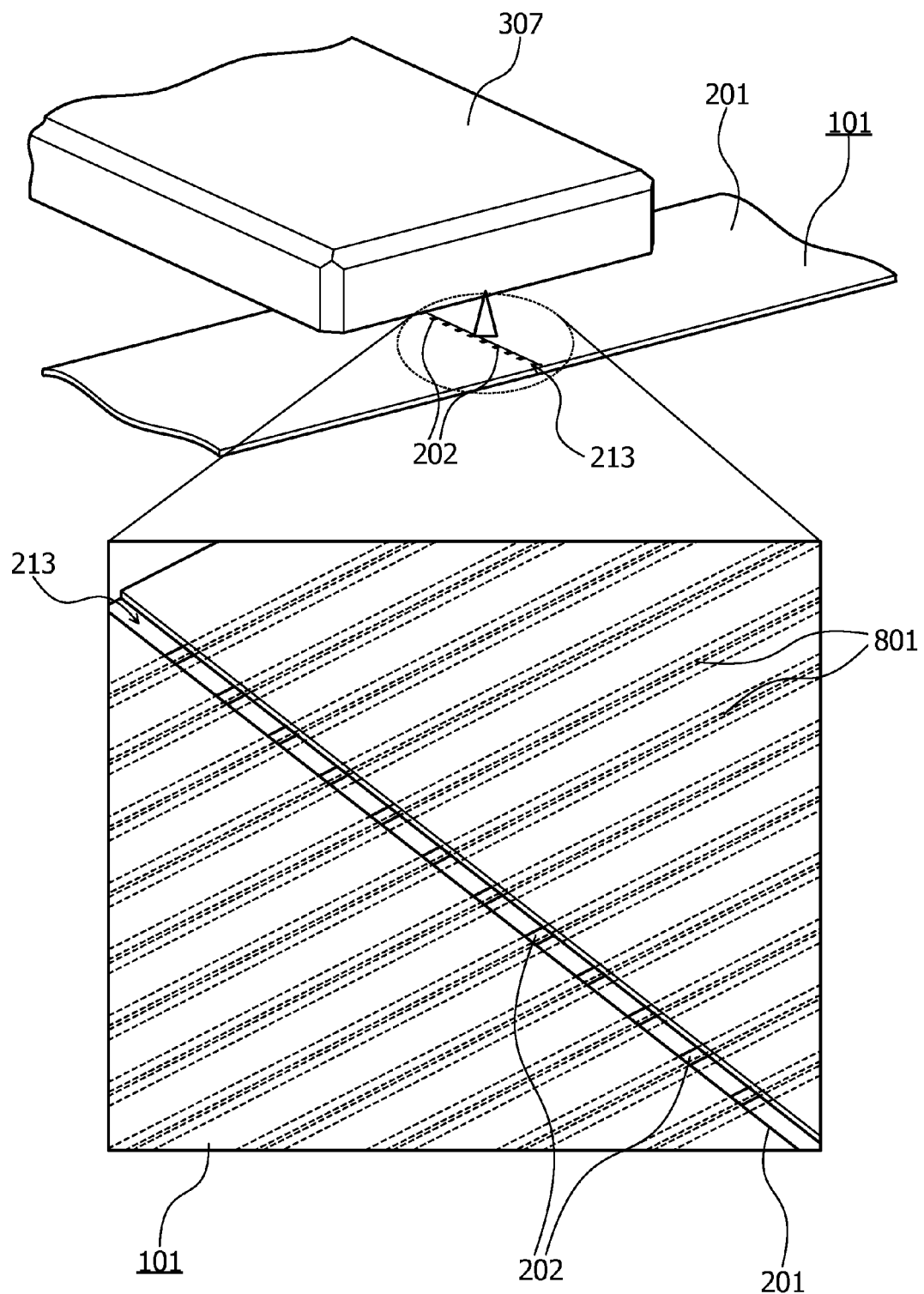
FIG. 8 illustrates an example of a method for manufacturing an optical unit.

The optical waveguide sheet 101 includes multiple, for example, 12 optical paths (see sign 801 in FIG. 8). Each of the multiple optical paths (optical interconnection) is arranged in parallel to the length direction of the optical waveguide sheet 101. In that length direction, an end of the optical waveguide sheet 101 on the side opposite to the side on which the optical module 102 is provided is inserted into an insertion hole of an optical connector 103. Thus, an optical path included in the optical waveguide sheet 101 is coupled with the optical connector 103.

The optical connector 103 includes a group of lenses including multiple, for example, 12 lenses on the side opposite to the side on which the optical waveguide sheet 101 is inserted in the optical connector 103. Each lens of the group of lenses is provided at a position which each corresponds to each optical path on the optical waveguide sheet 101. Each lens of the group of lenses is configured to transmit light emitted from each optical path in the optical waveguide sheet 101 to outside of the optical connector 103 or transmit, to each optical path, light entering each lens from the outside of the optical connector 103.

Figure 2:
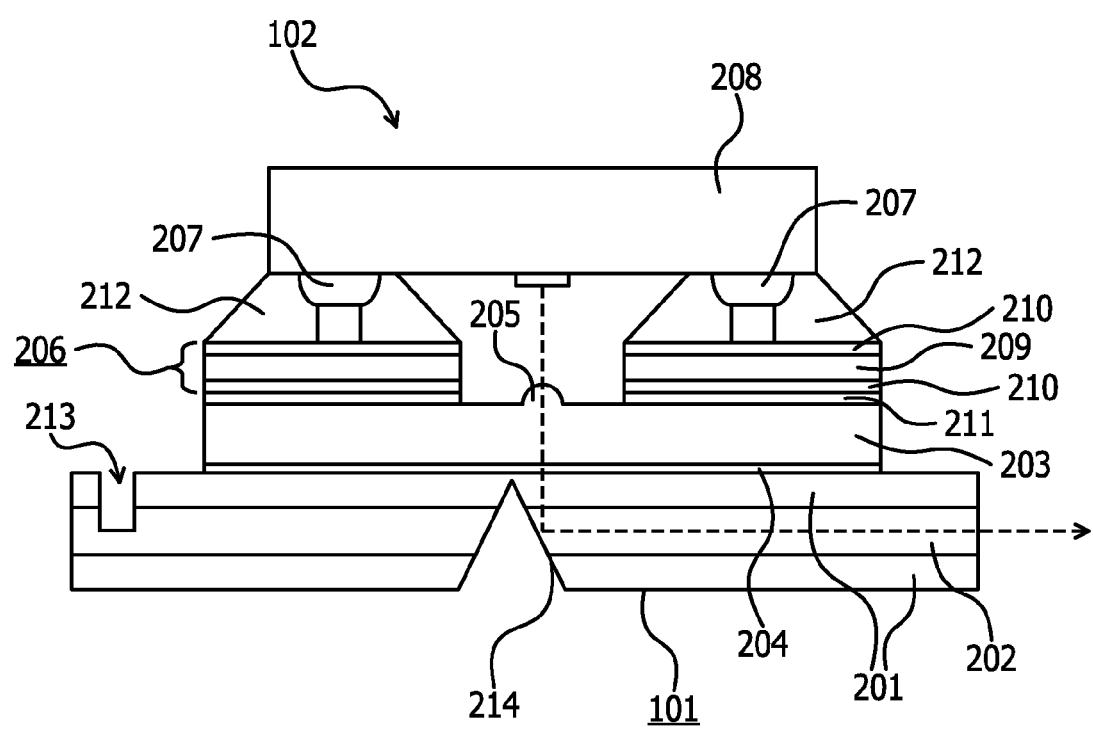
FIG. 2 illustrates an example of a cross section of an optical unit.

FIG. 2 illustrates an example of a cross section of the optical unit. FIG. 2 illustrates a state in which the optical module 102 which is an optical component in the optical unit 100 and the optical waveguide sheet 101 around the optical module 102 is cut. In FIG. 2, the optical waveguide sheet 101 includes clads 201 and a core 202 which is covered by the clads 201. The clads 201 may be a clad member and may be formed by using a material such as a polynorbornene resin or a fluorinated polyimide resin/polyimide resin, and the like.

In the core 202, multiple, for example, 12 optical paths are formed. A mirror 214 is provided on the optical paths. The mirror 214 is configured to refract light and transmit light from the optical module 102 to the side of the optical connector 103. The mirror 214 is configured to transmit light from the side of the optical connector 103 to the optical module 102. The core 202 may be formed with polyimide, for example.

The multiple, for example, 12 optical paths are arranged side by side at certain intervals on the optical waveguide sheet 101. The interval of the optical paths may be approximately 125 μm. A direction in which the optical paths are arranged may be hereinafter referred to as a "width direction of the optical waveguide sheet 101" or simply as an "width direction". The width direction of the optical waveguide sheet 101 is orthogonal to the length direction of the optical waveguide sheet 101.

A sheet-shaped lens sheet 203 is attached to one surface side of the optical waveguide sheet 101. The lens sheet 203 is fixed to the optical waveguide sheet 101 by a sheet resin 204 having stickiness at normal temperature. The lens sheet 203 includes multiple, for example, 8 lenses 205 linearly arranged along the width direction of the optical waveguide sheet 101. Each of the lenses 205 is provided at a position that corresponds to an optical path position. Each of the lenses 205 projects to a direction opposite to the optical waveguide sheet 101.

The optical module 102 is mounted on the opposite side to the optical waveguide sheet 101 of the lens sheet 203. The optical module 102 includes flexible substrates 206, optical component electrodes 207, and an optical device component (VCSEL: Vertical Cavity Surface Emitting LASER) 208. The flexible substrate 206 includes a polyimide (PI) film 209 and electric wiring 210 provided on the PI film 209.

The optical module 102 is fixed to the optical waveguide sheet 101 by bonding the flexible substrate 206 and the lens sheet 203 to the optical waveguide sheet 101 by a sheet resin 211 which is different from the sheet resin 204. The sheet resin 211 has stickiness at normal temperature, as similar to the sheet resin 204.

The optical component electrode 207 may be implemented by a salient electrode (Au bump) which is manufactured by using Au (gold), for example. The optical component electrode 207 is provided between the electric wiring 210 of the flexible substrate 206 and the optical device component 208, and electrically couples the electric wiring 210 of the flexible substrate 206 with the optical device component 208. The optical component electrode 207 is fixed to the flexible substrate 206 by an underfill material 212. The underfill material 212 fixes the electric wiring 210 of the flexible substrate 206 and the optical device component 208.

Figure 10:
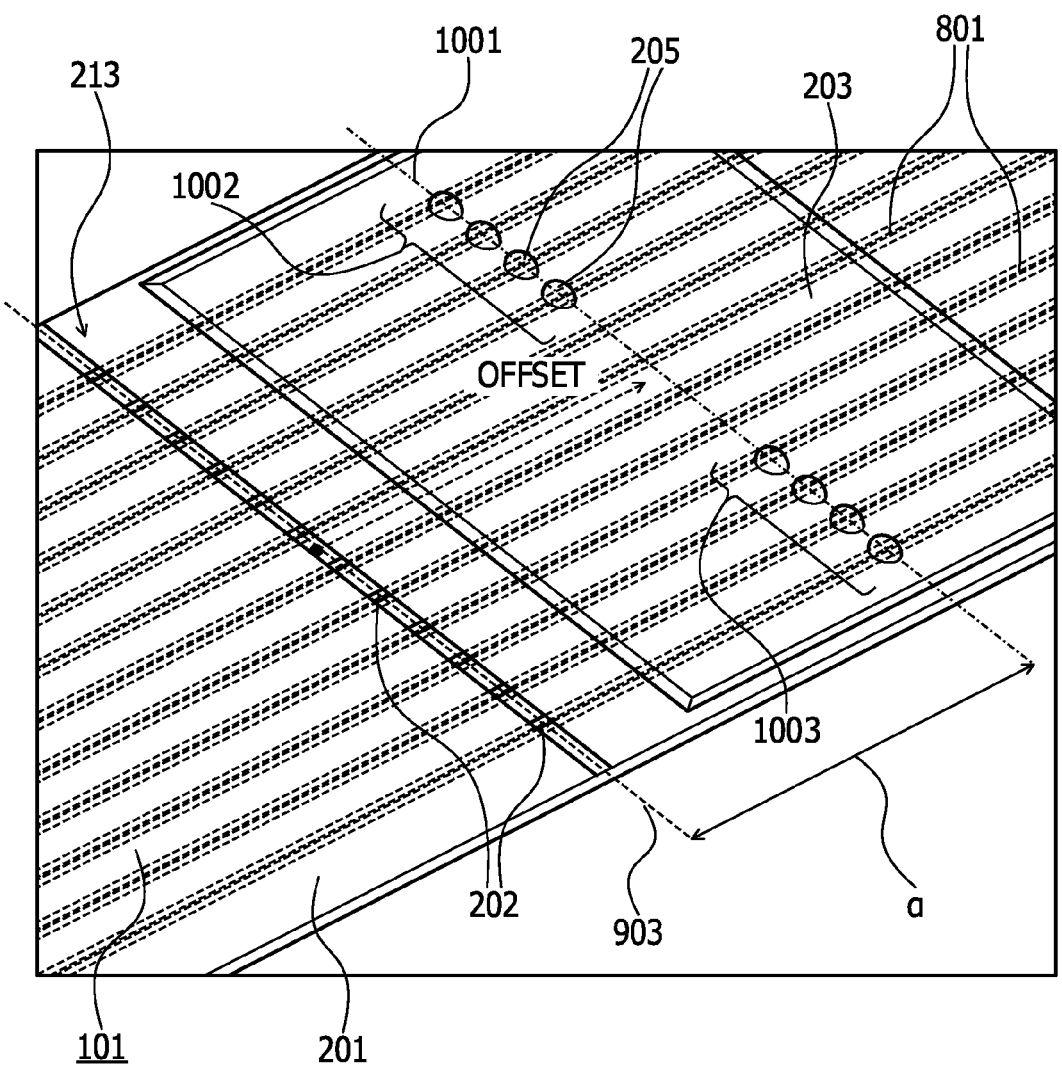
FIG. 10 illustrates an example of a method for manufacturing an optical unit.

The optical device component 208 is referred to as a vertical resonator surface-emitting laser and the like, and includes a light emitting optical device (see sign 1002 illustrated in FIG. 10) and a light receiving optical device (see sign 1003 illustrated in FIG. 10). The light emitting optical device emits laser light, which is resonated in the direction perpendicular to the substrate face of the optical device component, to the direction.

Multiple, for example, 4 light emitting optical devices are provided along the width direction of the optical waveguide sheet 101. The light emitting optical devices are arranged opposed to the respective lenses 205 in the lens sheet 203 in a thickness direction of the optical waveguide sheet 101, for example, in a vertical direction in a space illustrated in FIG. 2, and emit laser light to the respective lenses 205.

The light receiving optical device receives light emitted from the optical path by way of the lens 205 which corresponds to the optical path. Multiple, for example, 4 light receiving optical devices are provided along the width direction of the optical waveguide sheet 101. The light receiving optical devices are arranged opposed to the respective lenses 205 in the lens sheet 203 in the thickness direction of the optical waveguide sheet 101, for example, in the vertical direction in the space illustrated in FIG. 2.

The optical device component 208 includes a control IC (see sign 1401 illustrated in FIG. 14) configured to control light emission in the light emitting optical device or output a signal based on light received by the light receiving optical device from the optical device component 208 by way of the flexible substrate 206. The optical device component 208 has characteristics that power consumption is small, fast modulation is possible even at a low current, and a characteristic change with a temperature change has a small range.

In the optical waveguide sheet 101, an optical path recognition portion 213 is provided at a certain position which is around a position where an optical module 102 is mounted and which is on a face, for example, a first face, on which the optical module 102 is mounted. The optical path recognition portion 213 is provided on a face on the side on which the optical module 102 of the optical waveguide sheet 101 is mounted.

The optical path recognition portion 213 may be formed by the clad 201 being removed to the extent that a position of the optical path of the optical waveguide sheet 101 may be recognized. For example, the optical path recognition portion 213 may be formed by the clad 201 being removed and the optical path being exposed.

The optical path recognition portion 213 may be formed by the clad 201 being removed to the extent that a position of the optical path may be recognized. The optical path recognition portion 213 may be formed by the clad 201 being removed till the optical path is completely exposed. The optical path recognition portion 213 may be formed by the clad 201 being removed so that dimensions of the clad 201 in the thickness direction, for example, thickness of the clad 201 becomes such thickness that allows the position of the optical path to be recognized, without exposing the optical path.

The optical path recognition portion 213 is formed by the clad 201 being removed along a direction orthogonal to the optical path. Thus, a position of each optical path recognized by the optical path recognition portion 213 may linearly extend along the width direction of the optical waveguide sheet 101. A direction of the optical path recognition portion 213 may be a direction orthogonal to the optical path, for example, a direction which obliquely intersects the optical path.

The mirror 214 is provided on the opposite side to the lens sheet 203 in the optical waveguide sheet 101. The mirror 214 may correspond to a cutout face which is formed by cutting out a part of the optical waveguide sheet 101 and inclines to the optical path direction. The mirror 214 inclines to the optical path direction so that a mirror face is opposed to the end of the optical waveguide sheet 101 on the side of the optical connector 103 and the lens 205. The mirror 214 may be formed by cutting out the optical waveguide sheet 101 so that, for example, outside of the optical waveguide sheet 101, for example, the opposite side to the lens sheet 203 opens wider and the lens sheet 203 side opens narrower.

By forming the mirror 214, a part between the terminal end and the mirror 214, for example, a left side part of the mirror 214 in the optical path illustrated in FIG. 2 is a part in the optical path that is unused for propagation of light input to or output from the optical module 102. As illustrated in FIG. 2, the optical path recognition portion 213 is formed by the clad 201 being removed on the side on which the optical module 102 is to be mounted, to the extent that a position of the optical path may be recognized, at a certain position corresponding to the part that is unused for propagation. Since the optical path in that part will not be used for propagation of light, the removal of the clad 201, even if occurs, might not affect propagation of light.

Dimensions of each part included in the optical module 102 and of the optical waveguide sheet 101 in the thickness direction, for example, in the vertical direction in the space illustrated in FIG. 2 may be set as follows, for example. Thickness of the clad 201 of the optical waveguide sheet 101 may be approximately 25 μm and thickness of the core 202 may be approximately 50 μm. Thickness of the lens sheet 203 may be approximately 50 μm, thickness of the lens 205 part may be approximately 30 μm, and thickness of sheet resins 204, 211 may be approximately 25 μm. Thickness of the flexible substrate 206 may be approximately 25 μm, thickness of the optical component electrode (Au bump) 207 may be 15 μm, and thickness of the optical device component 208 may be 150 μm.

Figure 3:
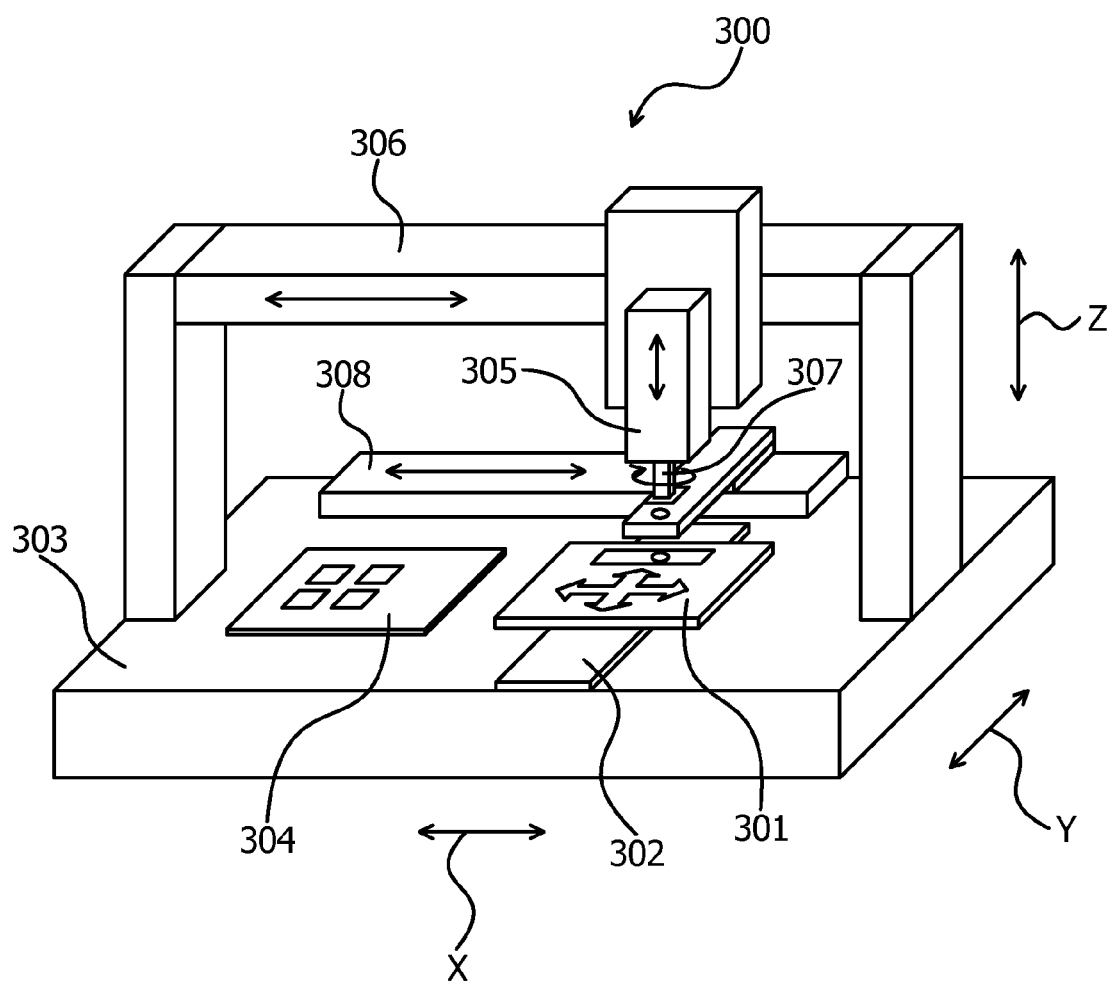
FIG. 3 illustrates an example of a component-mount machine.

FIG. 3 illustrates an example of a component-mount machine.

In FIG. 3, a component-mount machine 300 includes an XY stage 301 configured to hold a first component. The XY stage 301 is provided to be movable in a Y direction (front-back direction) along a rail 302 extending to the Y direction, for example, the arrow Y direction illustrated in FIG. 3. The rail 302 is provided on a pedestal 303. A component supply stage 304 is provided on the pedestal 303. A second component in state before being attached to the first component may be placed on the component supply stage 304.

The component-mount machine 300 includes a mount head 305 configured to hold the second component to be attached to the first component. The mount head 305 is provided to be movable in a Z direction, for example, the vertical direction in a space illustrated in FIG. 3. Thus, the second component held by the mount head 305 is moved to the Z direction and to a direction in which the mount head 305 moves toward and away from the second component. The mount head 305 is provided to be movable in the X direction, for example, the X direction (horizontal direction) along a rail 306 extending to the horizontal direction illustrated in FIG. 3. Thus, the second component held by the mount head 305 is moved to the X direction.

A sensor camera 307 is provided between the XY stage 301 and the mount head 305. A position of the first component held by the XY stage 301 is recognized based on an image taken by the sensor camera 307. The sensor camera 307 includes a light source configured to irradiate the XY stage 301 with light.

The sensor camera 307 is provided to be movable in the X direction (horizontal direction) along a rail 308 extending in the X direction. Thus, the sensor camera 307 may be evacuated from between the XY stage 301 and the mount head 305, so that the second component confronts the first component.

The component-mount machine 300 includes a control unit configured to control a shooting operation by the sensor camera 307 or control movement of the sensor camera 307. The control unit controls turning on/off of a light source which the component-mount machine 300 includes. The control unit controls movement of the XY stage 301 or the component supply stage 304 based on the image taken by the sensor camera 307.

FIGS. 4, 5, 6A, 6B, 7A, 7B, 8, 9, 10, 11A, 11B, 12A, 12B, 13, 14, 15, and 16 illustrate an example of a method for manufacturing an optical unit. The method for manufacturing an optical unit may include six processes from a first process 1 to a six process 6, for example.

First Process

Figure 4:
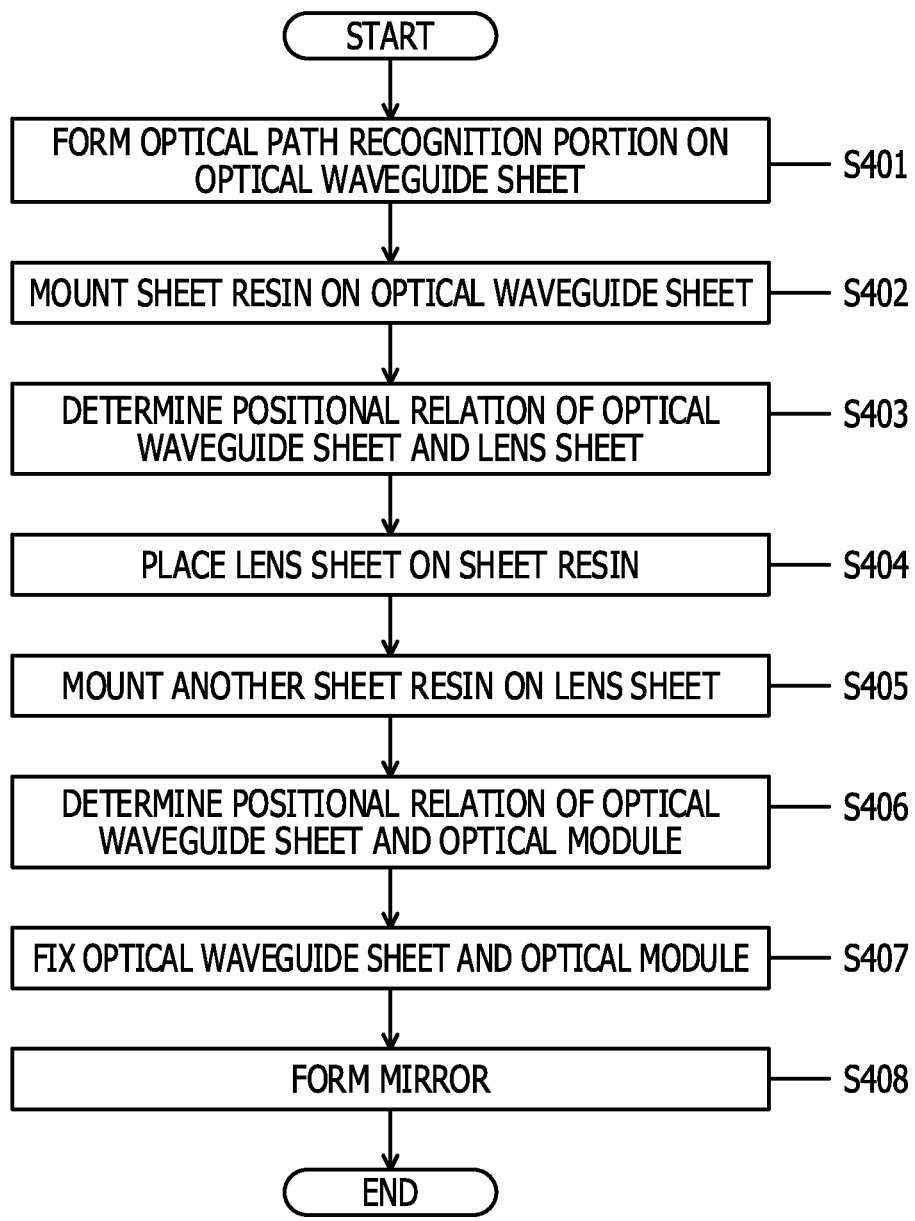
FIG. 4 illustrates an example of a method for manufacturing an optical unit.
Figure 5:
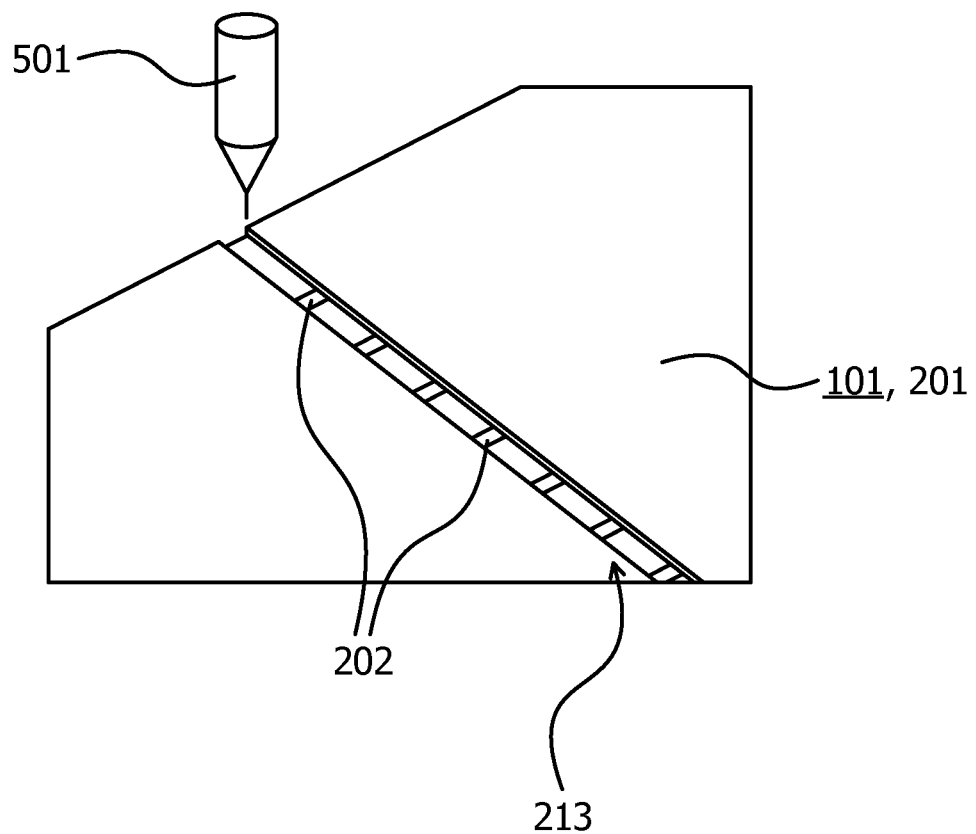
FIG. 5 illustrates an example of a method for manufacturing an optical unit.

In FIG. 4, an optical path recognition portion 213 as a mounting check guide is formed on an optical waveguide sheet 101 (operation S401). When the optical path recognition portion 213 is formed, laser processing from one surface side of the optical waveguide sheet 101 is performed with laser light emitted from a laser light source 501, as illustrated in FIG. 5, for example.

Figure 6A:
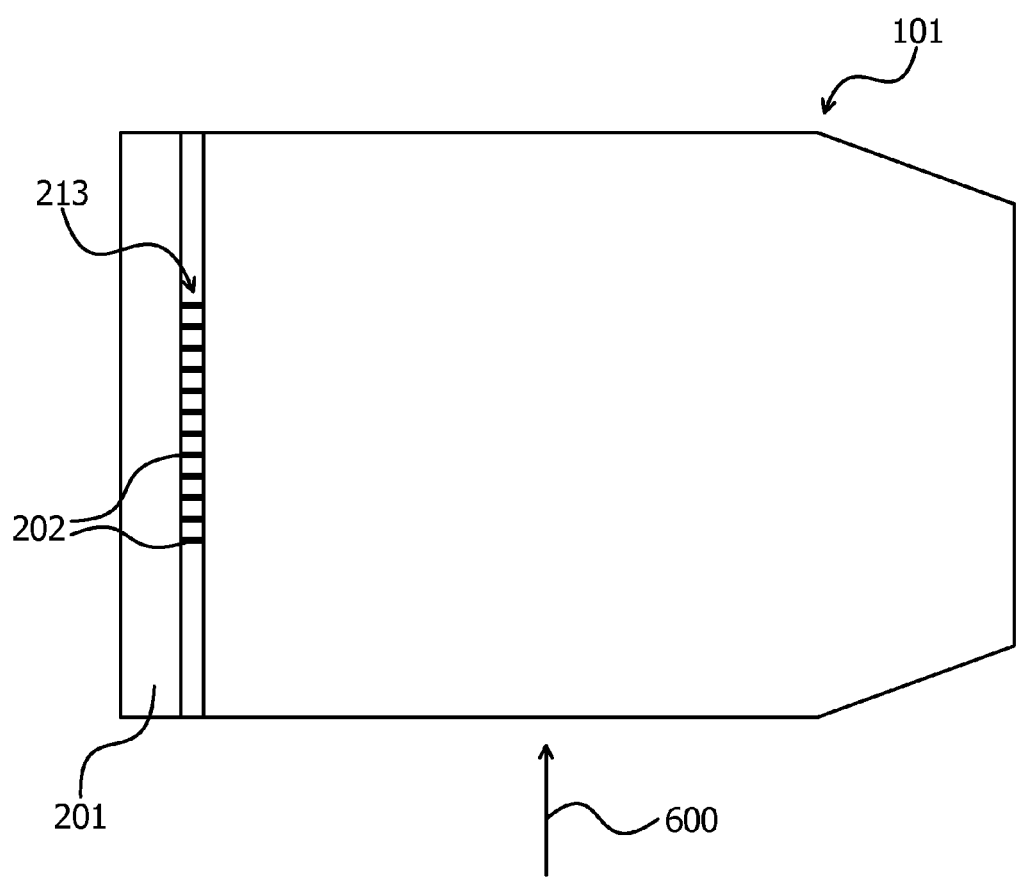
FIG. 6A to FIG. 6B illustrate an example of method for manufacturing an optical unit.
Figure 6B:
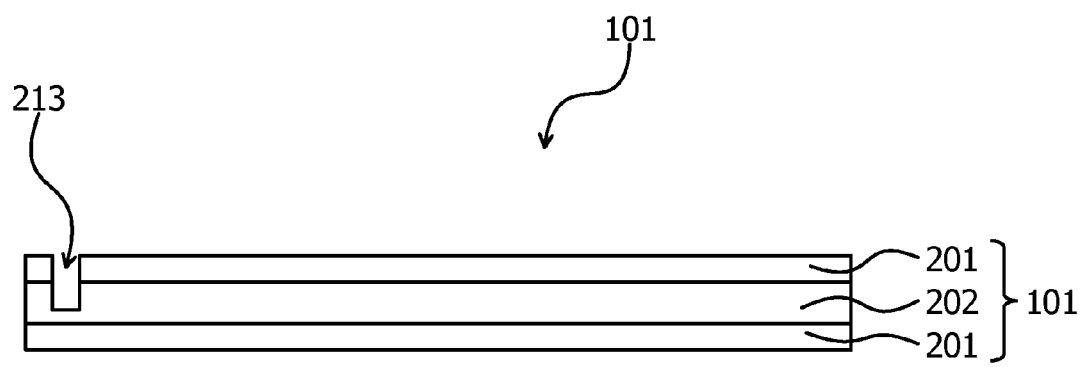

A clad 201 is removed by the laser processing linearly along the width direction of the optical waveguide sheet 101, and thereby the optical path recognition portion 213 is formed. A publicly known technology may be used for the laser processing. FIG. 6A illustrates a state viewed from a front face of the optical waveguide sheet 101 on which the optical path recognition portion 213 is formed. FIG. 6B illustrates a state, viewed from an arrow 600 direction in FIG. 6A, of the optical waveguide sheet 101 on which the optical path recognition portion 213 is formed.

Second Process

The optical waveguide sheet 101 on which the optical path recognition portion 213 is formed is placed as a first component on an XY stage 301 in a component-mount machine 300. A sheet resin 204 is placed as a second component on a component supply stage 304 in the component-mount machine 300. In this state, a position of the optical path recognition portion 213 is recognized based on an image taken by a sensor camera 307. A positional relation of the optical waveguide sheet 101 and the sheet resin 204 is determined by moving the XY stage 301 to the Y direction or moving the mount head 305 to the X direction, based on the recognized position of the optical path recognition portion 213.

The positional relation between the optical waveguide sheet 101 and the sheet resin 204 is adjusted to be such a positional relation that an end of the sheet resin 204 is spaced away from the optical path recognition portion 213 toward an optical connector 103 by a certain offset distance (see sign a illustrated in FIG. 10). The certain offset distance may be defined in advance when an optical unit 100 is designed, for example.

Figure 7A:
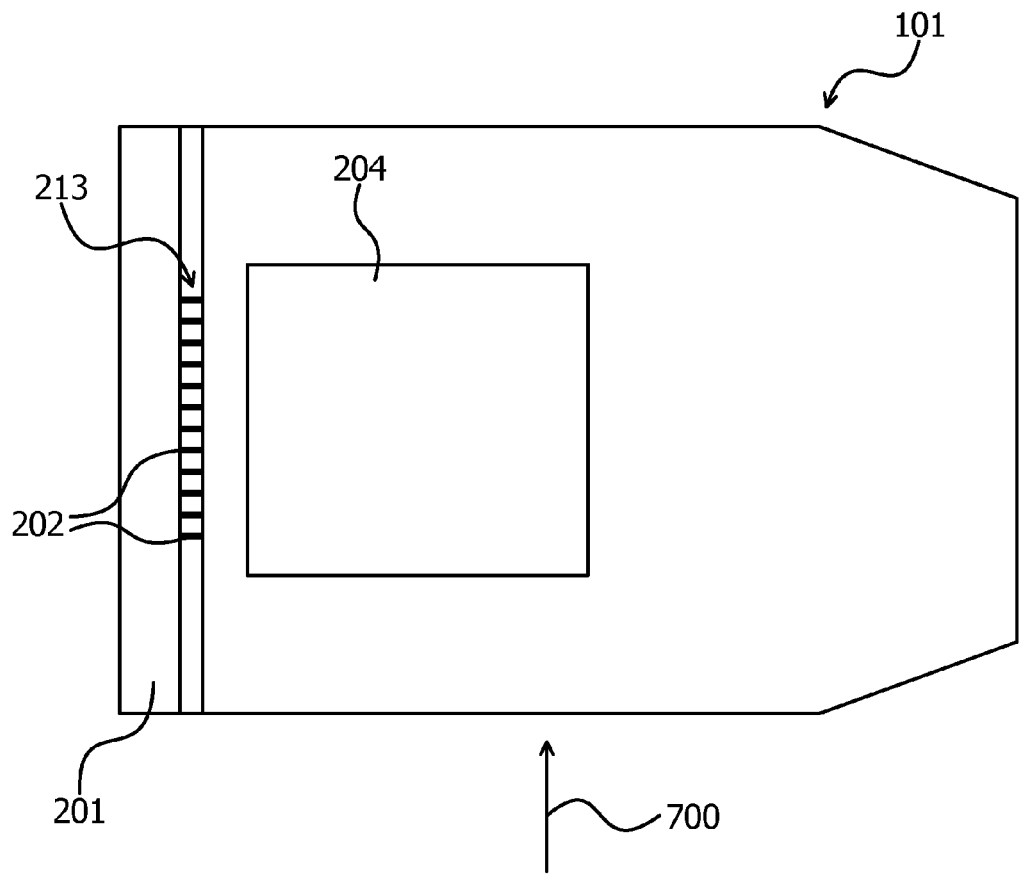
FIG. 7A to FIG. 7B illustrate an example of method for manufacturing an optical unit.
Figure 7B:
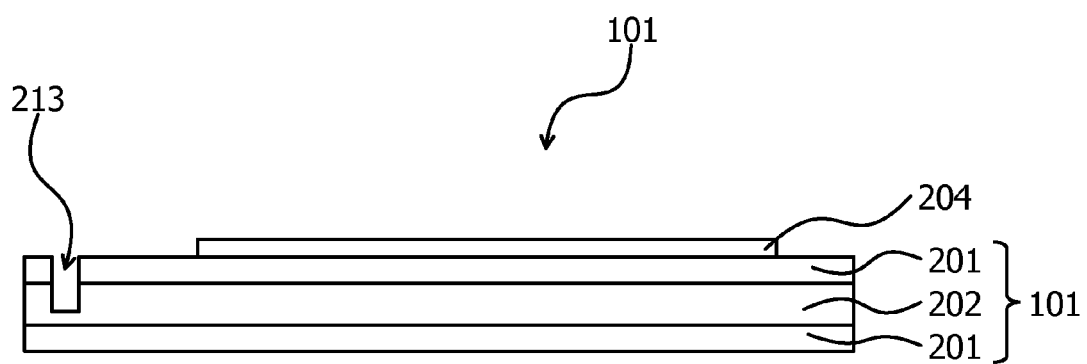

The sensor camera 307 is evacuated from between the XY stage 301 and the mount head 305, and the mount head 305 is moved along the Z direction so that the optical waveguide sheet 101 and the sheet resin 204 come close. The sheet resin 204 is mounted on the optical waveguide sheet 101 on which the optical path recognition portion 213 is formed (operation S402). FIG. 7A illustrates a state viewed from the front face of the optical waveguide sheet 101 on which the sheet resin 204 is mounted. FIG. 7B illustrates a state, viewed from an arrow direction 700 in FIG. 7A, of the optical waveguide sheet 101 on which the sheet resin 204 is mounted.

Third Process

A lens sheet 203 is placed as a second component on the component supply stage 304 of the component-mount machine 300. The optical waveguide sheet 101 on which the sheet resin 204 is mounted is placed as a first component on the XY stage 301 of the component-mount machine 300. In this state, a positional relation of the optical waveguide sheet 101 and the lens sheet 203 is determined by moving the XY stage 301 to the Y direction or moving the mount head 305 to the X direction, based on the images taken by the sensor camera 307 (operation S403).

The positional relation of the optical waveguide sheet 101 and the lens sheet 203 may be determined through the use of the optical path recognition portion 213. For example, when the positional relationship of the optical waveguide sheet 101 and the lens sheet 203 is determined, as illustrated in FIG. 8, the sensor camera 307 of the component-mount machine 300 irradiates the optical path recognition portion 213 with light and an outline of an optical path 801 is recognized based on reflected light.

The optical path recognition portion 213 (optical waveguide sheet 101) may be irradiated with light from directly above the optical waveguide sheet 101. The outline of the optical path 801 may be recognized based on brightness or darkness resulting from light reflected on, for example, the image taken by the sensor camera 307.

Figure 9:
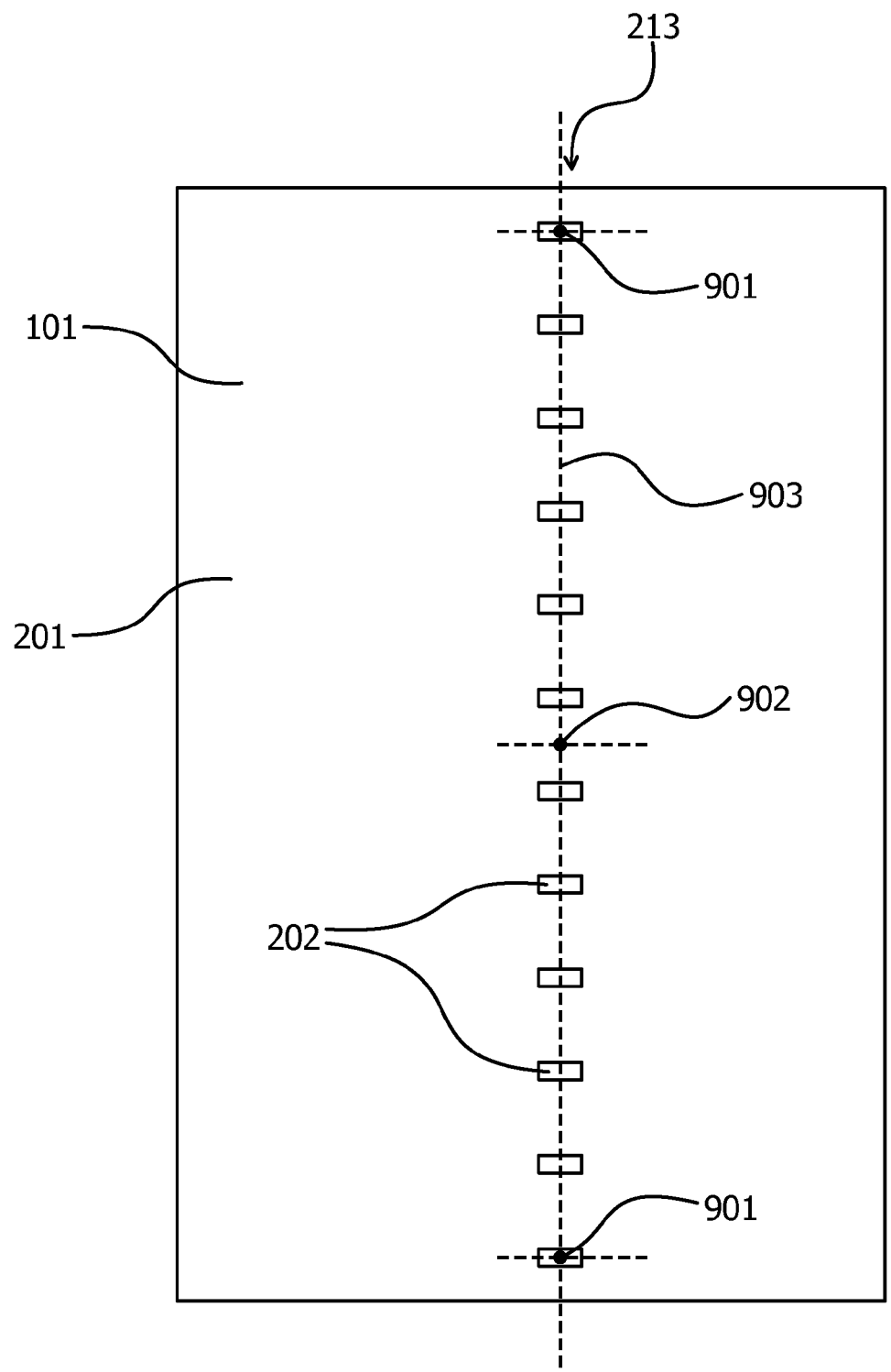
FIG. 9 illustrates an example of a method for manufacturing an optical unit.

As illustrated in FIG. 9, center points 901 of the optical paths 801 on both ends, of the respective optical paths 801 forming the optical path recognition portion 213, are determined based on the recognized outline of the optical path 801. A position (vertical axial point) 902 which is the center of the multiple optical paths 801 arranged along the width direction of the optical waveguide sheet 101 is determined based on the determined center points 901. The virtual axial point 902 may be determined to be an intermediate position between the center points 901 of the optical paths 801 on both ends. A virtual axis 903 coupling the center points 901 of the respective optical paths 801 is made parallel to the width direction of the optical waveguide sheet 101.

As illustrated in FIG. 10, the positional relation between the optical waveguide sheet 101 and the lens sheet 203 is adjusted. For example, in a state in which positions of the virtual axial points 902 is coincident with a position of the center point of the lens sheet 203 in the width direction of the optical waveguide sheet 101, the positional relation of the optical waveguide sheet 101 and the lens sheet 203 is adjusted so that a virtual line 1001 coupling the centers of the lens 205 is spaced from the virtual axis 903 by the offset distance α.

FIG. 10 illustrates the optical waveguide sheet 101 and the lens sheet 203 in a state in which the positional relation is adjusted. As illustrated in FIG. 10, the position of the lens sheet 203 is adjusted based on the positions of the optical paths 801 recognized in the optical path recognition portion 213, and thereby the positions of the respective optical paths 801 and the respective lenses 205 are aligned with high accuracy. Thus, the optical paths 801 on a mount surface side of the lens sheet 203 of the optical waveguide sheet 101 are exposed and the lens sheet 203 is mounted with respect to the positions of the optical paths 801. In this way, the lens sheet 203 is mounted with ease and with high accuracy.

In FIG. 10, sign 1002 denotes a light emitting optical device and sign 1003 denotes a light receiving optical device. The lens 205, the light emitting optical devices 1002, and the light receiving optical devices 1003 realize an optical component to be mounted on the optical waveguide sheet 101.

Figure 11A:
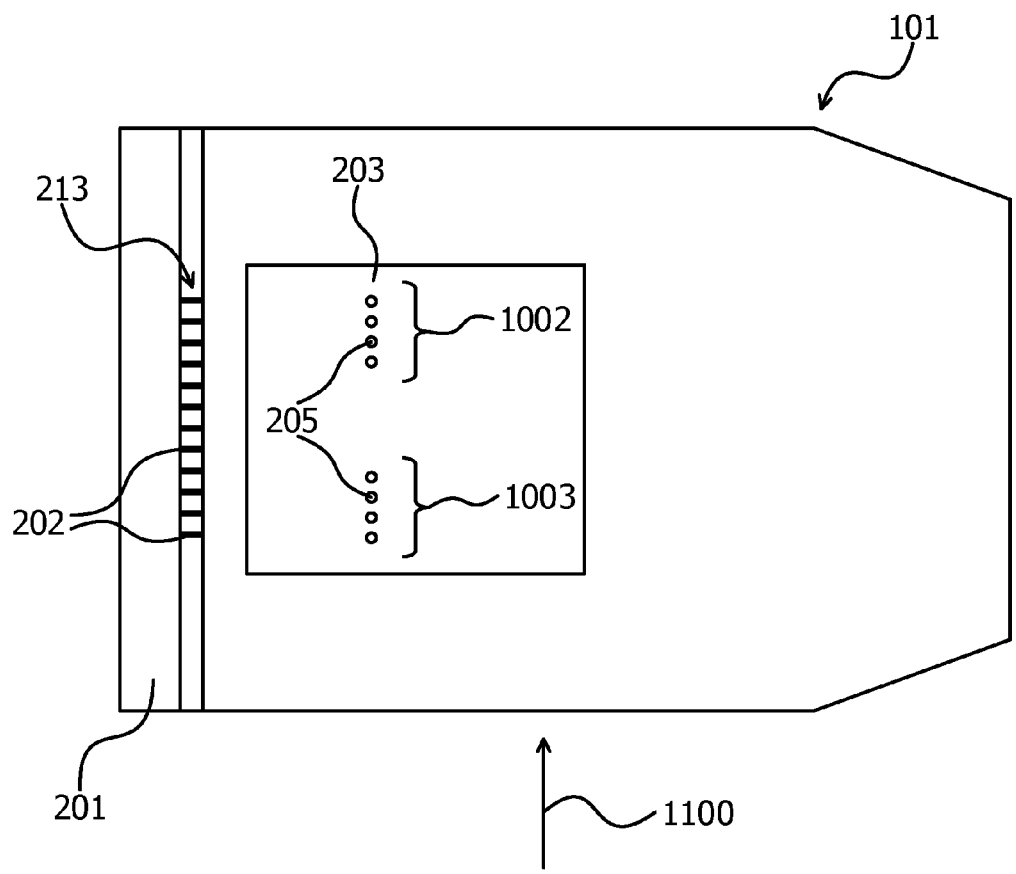
FIG. 11A to FIG. 11B illustrate an example of method for manufacturing an optical unit.
Figure 11B:
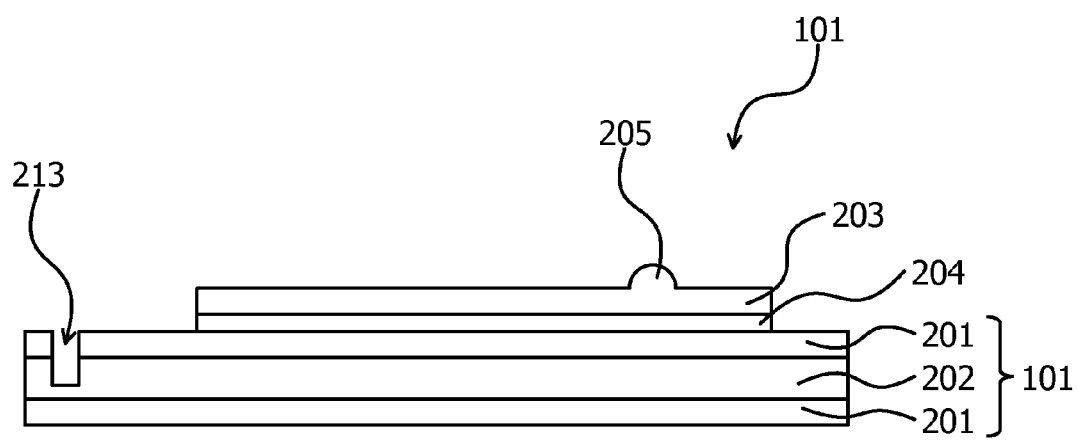

Then, the sensor camera 307 is evacuated from between the XY stage 301 and the mount head 305, and the mount head 305 is moved along the Z direction so that the sheet resin 204 and the lens sheet 203 come close. Thus, the lens sheet 203 is placed on the sheet resin 204 (operation S404), and the optical waveguide sheet 101 and the lens sheet 203 are bonded. FIG. 11A illustrates the optical waveguide sheet 101 on which the lens sheet 203 is mounted viewed from the front face of the optical waveguide sheet 101. FIG. 11B illustrates the optical waveguide sheet 101 on which the lens sheet 203 is mounted viewed from an arrow 1100 direction in FIG. 11A.

Fourth Process

The optical waveguide sheet 101 to which the lens sheet 203 is bonded is placed as a first component on the XY stage 301 in the component-mount machine 300. Another sheet resin 211 is placed as a second component on the component supply stage 304 of the component-mount machine 300. A positional relation of the optical waveguide sheet 101 to which the lens sheet 203 is bonded and another sheet resin 211 is determined by moving the XY stage 301 to the Y direction or moving the mount head 305 to the X direction, based on the image taken by the sensor camera 307. Another sheet resin 211 is placed on the lens sheet 203 so that each of the lenses 205 on the lens sheet 203 is avoided and the positions in which another sheet resin 211 superimpose with the lenses 205 are left empty.

Figure 12A:
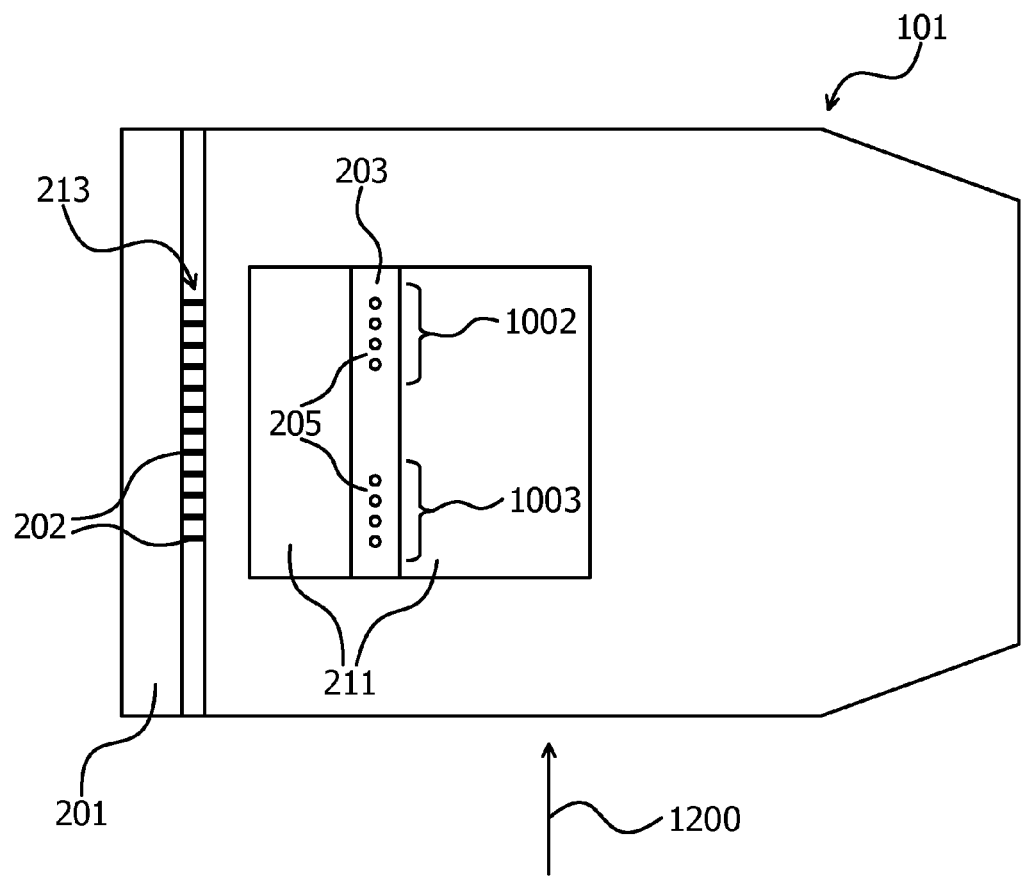
FIG. 12A to FIG. 12B illustrate an example of method for manufacturing an optical unit.
Figure 12B:
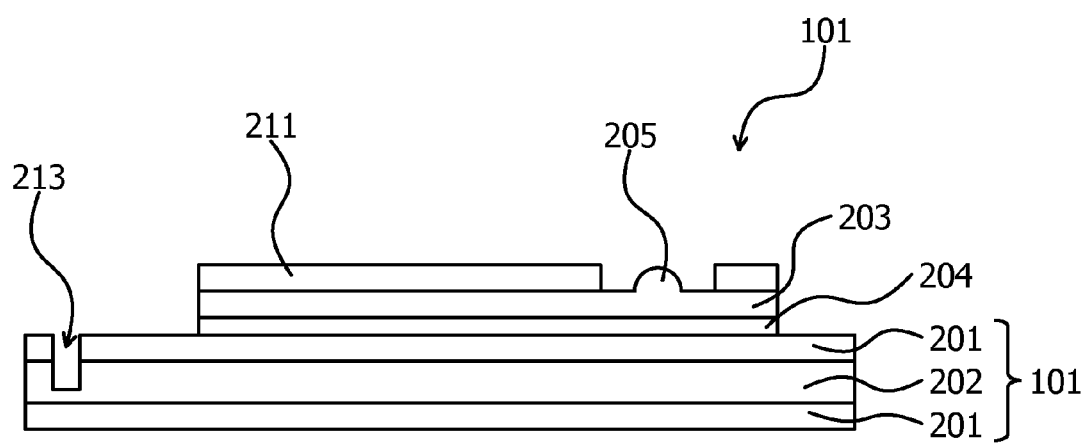

Then, the sensor camera 307 is evacuated from between the XY stage 301 and the mount head 305, and the mount head 305 is moved to the Z direction so that the lens sheet 203 and another sheet resin 211 come close. Thus, another sheet resin 211 is mounted on the lens sheet 203 (operation S405). FIG. 12A illustrates the optical waveguide sheet 101 on which another resin sheet 211 is mounted viewed from a front face of the optical waveguide sheet 101. FIG. 12B illustrates the optical waveguide sheet 101 on which another sheet resin 211 is mounted viewed from an arrow 1200 direction in FIG. 12A.

Fifth Process

An optical module 102 is placed as a second component on the component supply stage 304 of the component-mount machine 300. The optical waveguide sheet 101 on which another sheet resin 211 is placed is placed as a first component on the XY stage 301 of the component-mount machine 300. In this state, a positional relation of the optical module 102 and the optical waveguide sheet 101 on which the lens sheet 203 or another sheet resin 211 is mounted is determined by moving the XY stage 301 to the Y direction or moving the mount head 305 to the X direction, based on the image taken by the sensor camera 307 (operation S406).

The positional relation of the optical module 102 and the optical waveguide sheet 101 may be determined similar to placement of the lens sheet 203 as described above. For example, light is thrown from directly above to the optical path recognition portion 213 of the optical waveguide sheet 101 by the sensor camera 307 of the component-mount machine 300. An outline of a core is recognized by light reflected from the optical path recognition portion 213 and a center point 901 of each core is determined. Then, a vertical axial point 902 is determined based on the determined center points 901.

Figure 13:
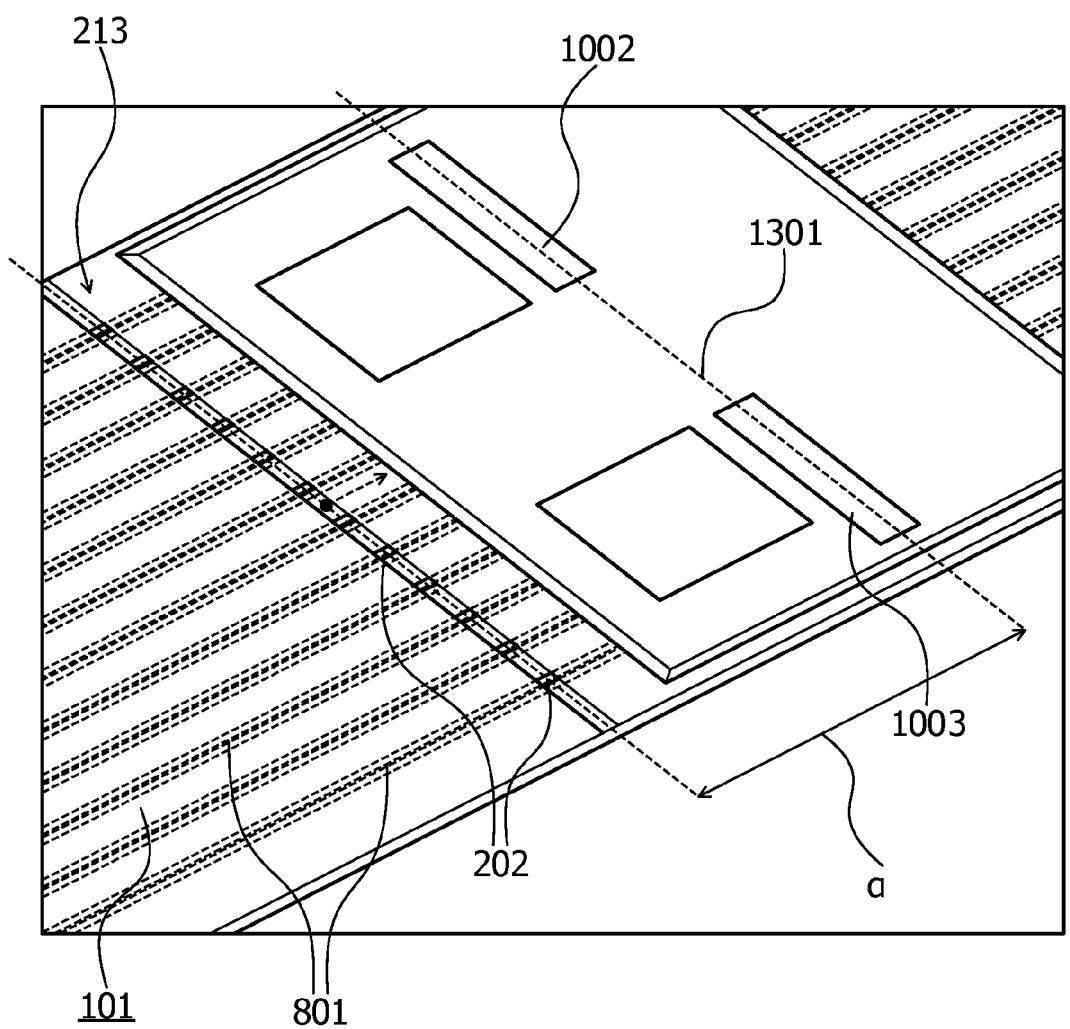
FIG. 13 illustrates an example of a method for manufacturing an optical unit.

As illustrated in FIG. 13, with the position of the virtual axial point 902 coincident with the position of the center point of the optical module 102 in the width direction of the optical waveguide sheet 101, a virtual line 1301 coupling the centers of the light emitting optical devices 1002 and the centers of the light receiving optical devices 1003 is spaced from the virtual axis 903 by the offset distance α. Thus, the positional relation of the optical waveguide sheet 101 and the optical module 102 is adjusted.

FIG. 13 illustrates the optical waveguide sheet 101 and the optical module 102 in a state in which the positional relation is adjusted. As illustrated in FIG. 13, by adjusting the position of the optical module 102 with respect to the optical waveguide sheet 101 based on the positions of the optical paths 801 recognized in the optical path recognition portion 213, the positions of the respective optical path 801, the light emitting optical devices 1002, and the light receiving optical devices 1003 might be aligned with high accuracy.

Then, the sensor camera 307 is evacuated from between the XY stage 301 and the mount head 305, the mount head 305 is moved along the X direction so that another sheet resin 211 and the optical module 102 come close. The optical waveguide sheet 101 and the optical module 102 are fixed by bonding a flexible substrate 206 of the optical module 102 to another sheet resin 211 (operation S407).

Figure 14:
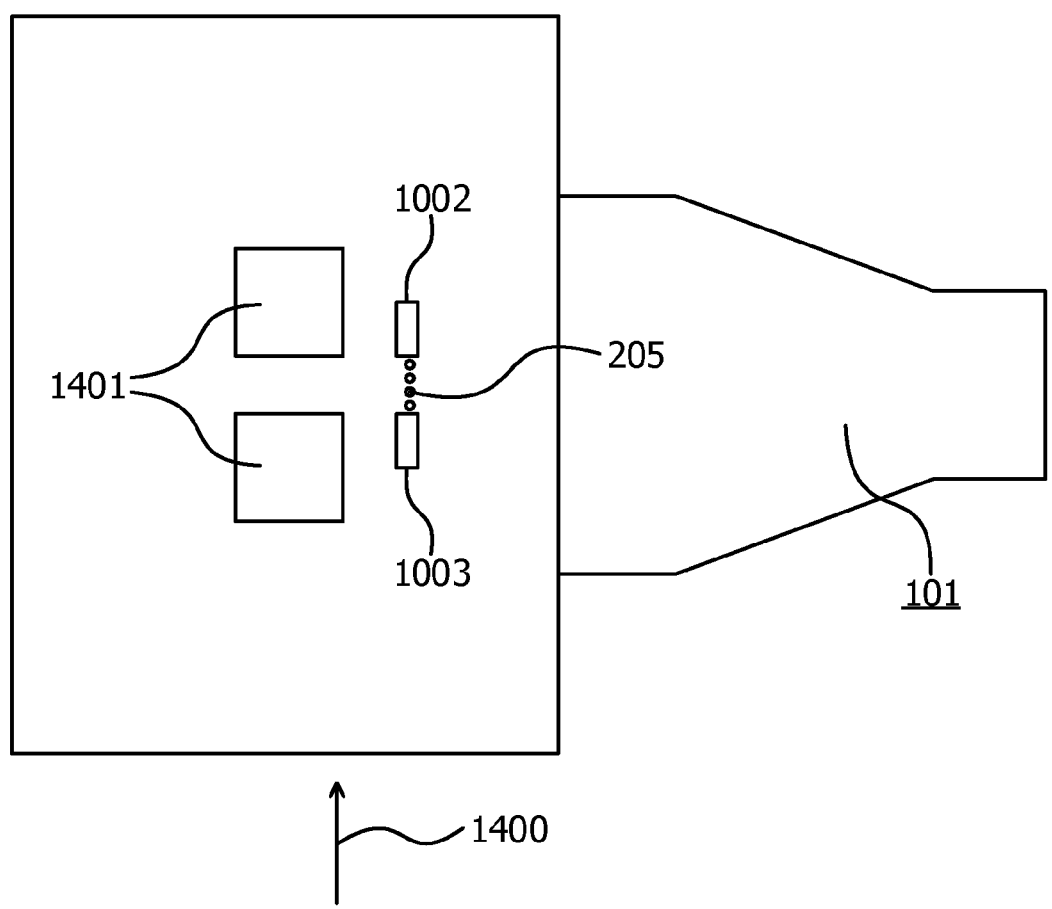
FIG. 14 illustrates an example of a method for manufacturing an optical unit.
Figure 15:
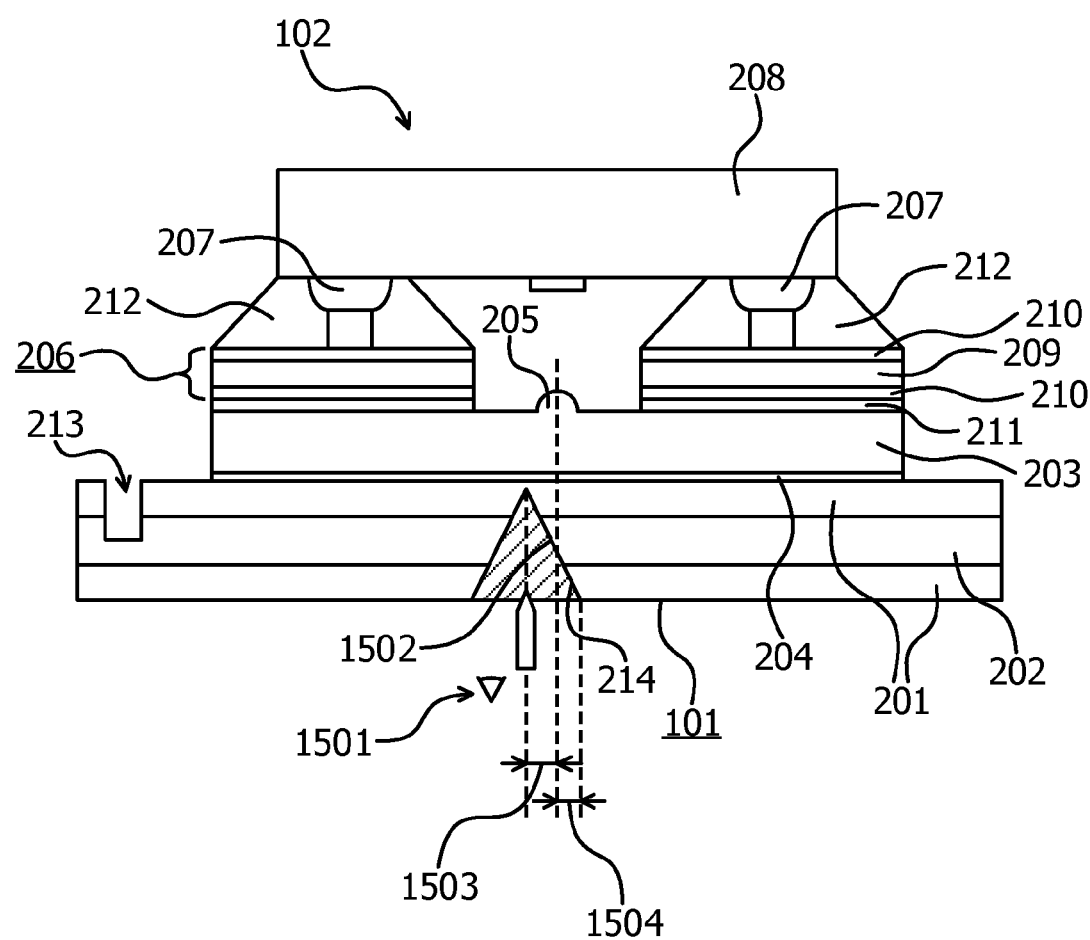
FIG. 15 illustrates an example of a method for manufacturing an optical unit.

FIG. 14 illustrates the optical waveguide sheet 101 on which the optical module 102 is mounted viewed from the front face of the optical waveguide sheet 101. FIG. 2 illustrates the optical waveguide sheet 101 on which the optical module 102 is mounted viewed from an arrow 1400 direction of FIG. 14. Thus, the optical paths 801 on the mount surface side of the optical module 102 of the optical waveguide sheet 101 are exposed and the optical module 102 is mounted with respect to the positions of the optical paths 801. In this way, the optical module 102 may be mounted with ease and with high accuracy.

Sixth Process

From the side opposite (back side) to the optical module 102 of the optical waveguide sheet 101, laser processing is performed on the optical waveguide sheet 101 to which the optical module 102 is attached and the mirror 214 is formed (operation S408). When the mirror 214 is formed, an outline of the lens 205, which may be transparently seen through the back side of the optical waveguide sheet 101 (see sign 1501 illustrated in FIG. 15), is identified and the center of the lens 205 is determined based on the identified outline of the lens 205.

In the length direction of the optical waveguide sheet 101, laser processing is performed so that the center of the lens 205 is coincident with the center of the mirror 214. The mirror 214 may correspond to an end face 1502 which is formed by cutting out a part of the optical waveguide sheet 101 with laser processing. The optical unit 100 is completed. In the mirror 214, length (see sign 1503 in FIG. 15) from the center of the lens 205 to the end of the mirror 214 on the side of the optical path recognition portion 213 is equal to length (see sign 1504 in FIG. 15) from the center of the lens 205 to the end of the mirror 214 on the side of the optical connector 103.

Forming of the mirror 214 may be performed through laser processing. Forming of the mirror 214 may be performed through, for example, dicing processing, instead of the laser processing. The mirror 214 may be formed through laser processing which does not use water as compared with the dicing processing which uses water in processing.

Figure 16:
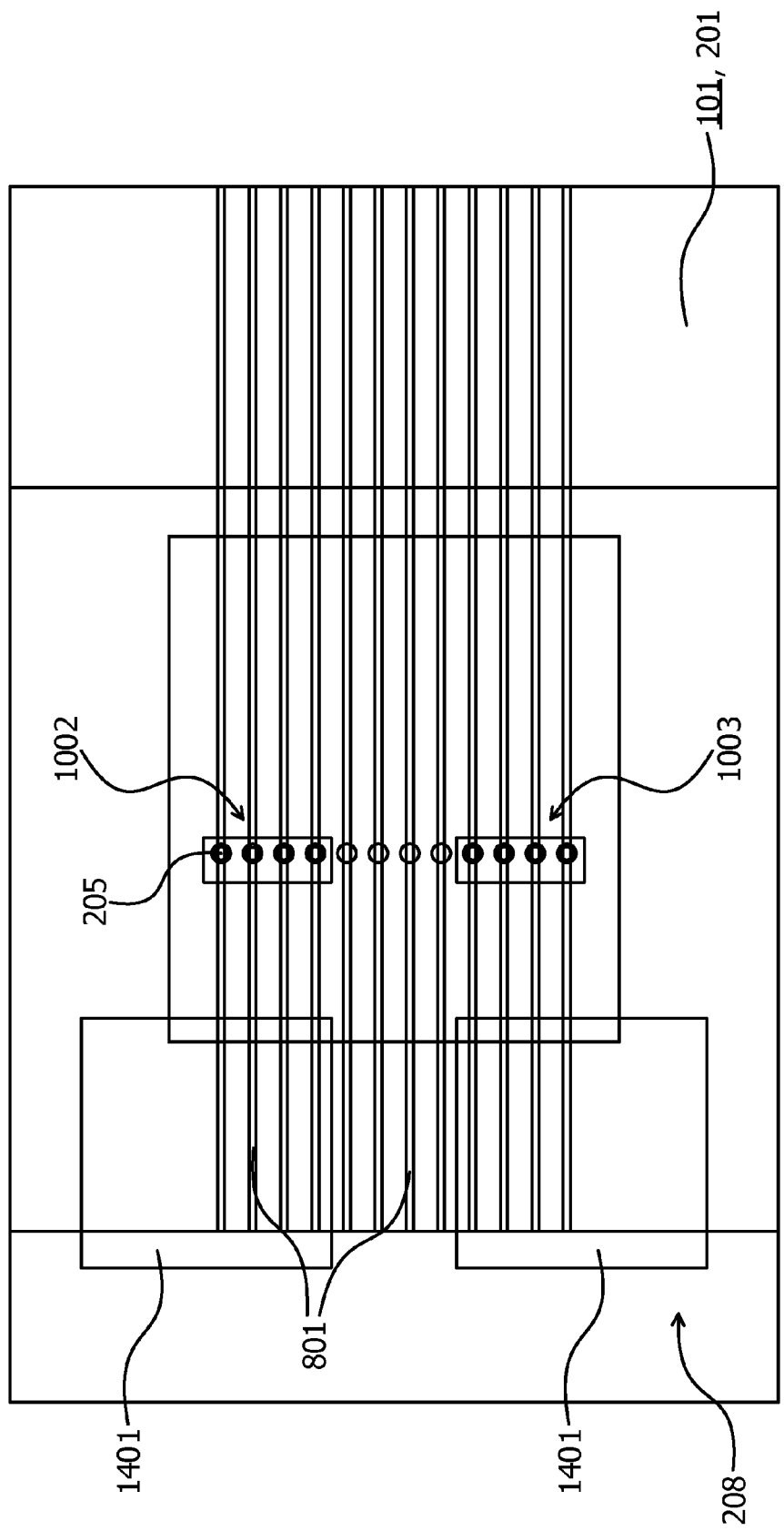
FIG. 16 illustrates an example of a method for manufacturing an optical unit.

FIG. 16 illustrates a positional relation of a core, lenses, and optical devices. FIG. 16 illustrates a positional relation of the optical path 801, the lenses 205, and the light emitting optical devices 1002 and the light receiving optical devices 1003. FIG. 16 illustrates a state in which a part of the optical unit 100 on the optical module 102 side is viewed from above in a space in FIG. 14. The first to six processes are sequentially performed to manufacture the optical unit 100. Thus, as illustrated in FIG. 16, the positions of the lenses 205, the light emitting optical devices 1002, and the light receiving optical devices 1003 are accurately placed or superimposed on the respective optical paths 801.

Figure 17:
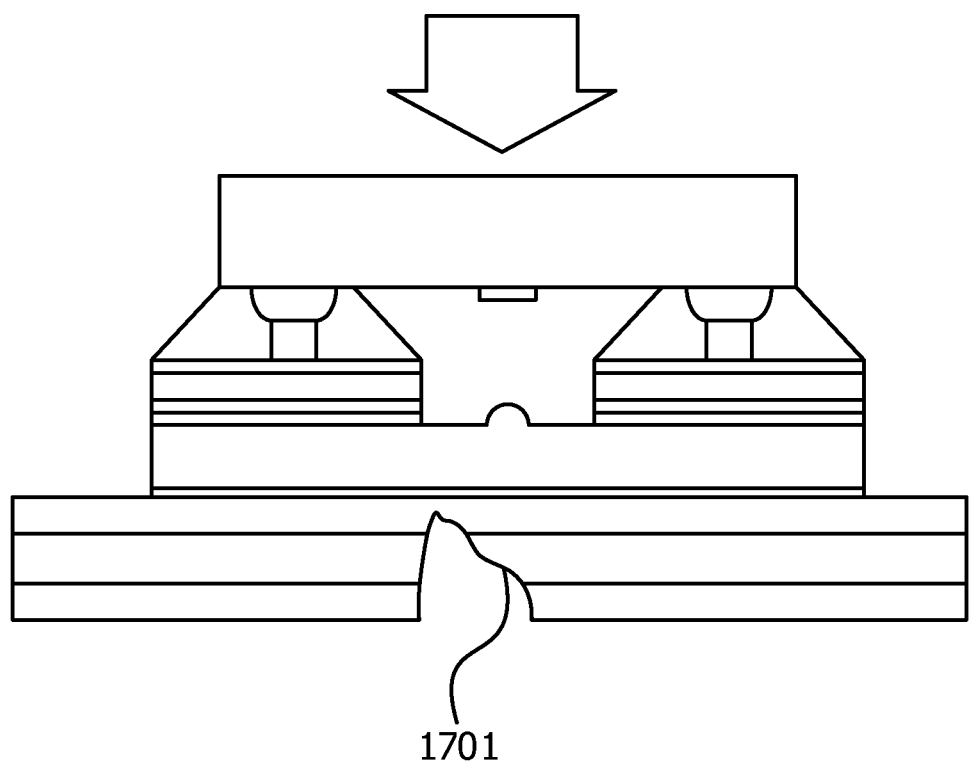
FIG. 17 illustrates an example of a method for manufacturing an optical unit.

FIG. 17 illustrates an example of a method for manufacturing an optical unit. In FIG. 17, an optical component is mounted on an optical waveguide sheet on which a mirror is formed in advance. As illustrated in FIG. 17, due to load of the optical component to an arrow direction or due to heat, the mirror which is formed in the range of proper reference values when the optical waveguide sheet is shipped is deformed as depicted by a sign 1701, and might deviate from the range of reference values. When the mirror is formed after the optical component is mounted in the sixth process, mirror deformation may be reduced.

Figure 18:
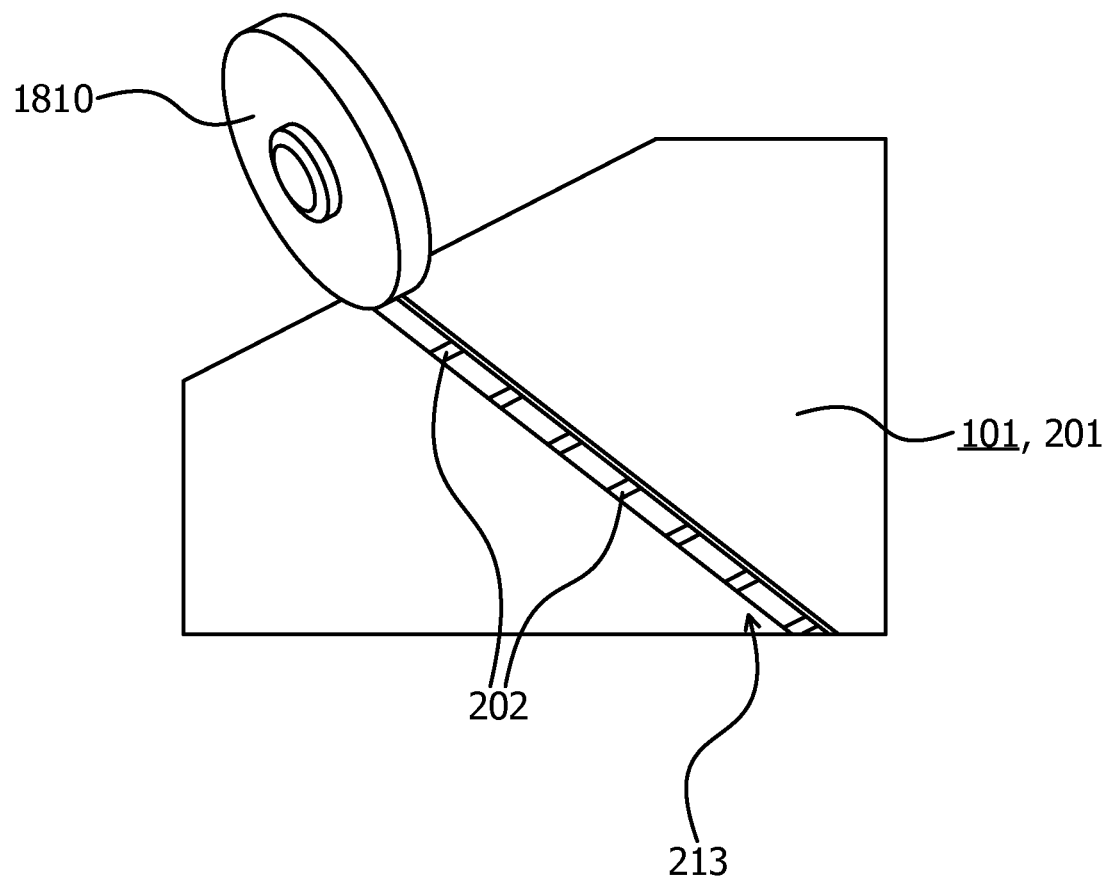
FIG. 18 illustrates an example of a method for forming an optical path recognition portion.
Figure 19:
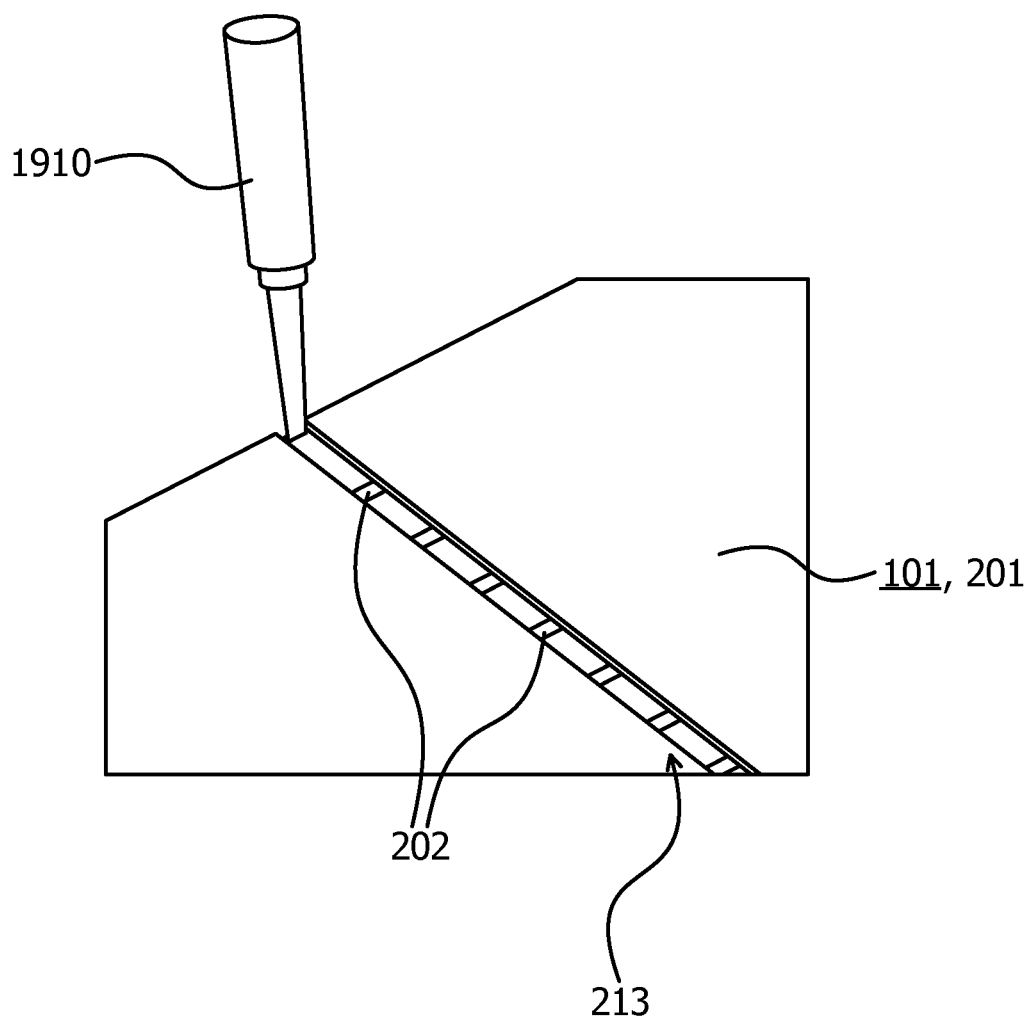
FIG. 19 illustrates an example of a method for forming an optical path recognition portion.

The optical path recognition portion 213 might be formed by laser processing. FIG. 18 and FIG. 19 illustrate an example of a method for forming an optical path recognition portion. The optical path recognition portion 213 may be formed by, for example, dicing (blade) processing which uses a blade 1810, instead of laser processing, as illustrated in FIG. 18. As illustrated in FIG. 19, the optical path recognition portion 213 may be formed by performing cutting and polishing processing with a cutting and polishing member 1910. As in the laser processing, any publicly known technology may be used as the dicing (blade) processing or the cutting and polishing processing.

The optical waveguide sheet 101 includes the optical path recognition portion 213 from which the clad 201 is removed to the extent that the position of the optical path 801 may be recognized, at a certain position on a surface on the side on which the optical component is to be mounted, for example, a part of the optical path 801 which is unused for propagation of light input to or output from the optical module 102, for example, in a part to the left of the mirror 214 of the core 202 illustrated in FIG. 2. Thus, the positions of the optical paths 801 might be directly recognized from the mount surface side of the optical waveguide sheet 101 by irradiating the optical path recognition portion 213 with light and letting the optical path 801 shine.

Positioning of optical components such as the lenses 205 or the respective optical devices 1002, 1003 with respect to the optical waveguide sheet 101 is performed based on the recognized positions of the optical paths 801. Thus, the optical component might be mounted with ease and with high accuracy without using the mirror 214. Improvement in mounting accuracy of an optical component on the optical waveguide sheet 101 might reduce loss of optical coupling with the mirror 214 and the lenses 205 or the respective optical devices 1002, 1003.

In the optical waveguide sheet 101, the clad 201 is removed and the optical paths 801 are exposed. This might allow the positions of the optical paths 801 to be recognized reliably. Thus, the optical component might be mounted with ease and with high accuracy.

In the optical waveguide sheet 101, if the clad 201 is removed along a direction orthogonal to the optical paths 801, positioning of an optical component might be performed easily. Thus, the optical component might be mounted with ease and with high accuracy.

The optical unit 100 includes the mirror 214 that is formed after an optical component is mounted on a face opposite to a face on which the optical component is mounted in the optical waveguide sheet 101. Deformation of the mirror 214 might be reduced, and optical coupling with the mirror 214 and the lens 205 or the respective optical devices 1002, 1003 might be reduced.

In the method for manufacturing the optical unit 100, a position is determined from the side of the optical waveguide sheet 101 on which an optical component is to be mounted and, then, the optical component is mounted. Then, a mirror is formed on an opposite surface to the surface of the optical waveguide sheet 101 on which the optical component is mounted. Thus, the optical unit 100 might be assembled with ease and with high accuracy, deformation of the mirror might be reduced, and loss of optical coupling may be reduced.

In the method for manufacturing the optical unit 100, the clad 201 is removed from the optical waveguide sheet 101 and the optical paths 801 are exposed on the optical waveguide sheet 101. By using such optical waveguide sheet 101, the positions of the optical paths 801 might be recognized reliably. Thus, the optical component might be mounted with ease and with high accuracy.

In the method for manufacturing the optical unit 100, by using the optical waveguide sheet 101 from which the clad 201 is removed along the direction orthogonal to the optical paths 801, the positioning of the optical component might be performed easily. The optical component might be mounted with ease and with high accuracy.

In the method for manufacturing the optical unit 100, a position that is away from the position of the optical path recognition portion 213 to the optical path direction by a distance α is determined as a position to mount an optical component. Thus, the position to mount the optical component might be determined with ease and with high accuracy. The optical unit 100 with little loss of optical coupling might be provided.

In the method for manufacturing the optical unit 100, in the optical waveguide sheet 101, after an optical component is mounted at a certain position on an mount surface of the optical component, the mirror 214 is formed on a surface opposite to the mount surface, aligned with the position of the mounted optical component. Thus, deformation of the mirror 214 might be reduced and loss of optical coupling might be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical waveguide sheet, comprising:
   an optical path;
   a first clad member that covers a first surface of the optical path on a first side where an optical component is mounted; and
   a mirror, provided on a second side opposite to the first side across the optical path, configured to transmit light from the optical component to the optical path or transmit light from the optical path to the optical component,
   wherein the first clad member has a portion formed by removing a part of the first clad member which does not underlay the optical component and is provided within an area which is unused for propagation of light input to and output from the optical component.

2. The optical waveguide sheet according to claim 1, wherein the portion is formed by removing the part of the first clad member to an extent that a position of the optical path is recognizable.

3. The optical waveguide sheet according to claim 1, wherein the portion is formed by removing the part of the first clad member and a part of the optical path.

4. The optical waveguide sheet according to claim 1, wherein the portion is formed by removing the part of the first clad member along a direction orthogonal to the optical path.

5. The optical waveguide sheet according to claim 1, wherein the mirror is formed after the optical component is mounted.

6. The optical waveguide sheet according to claim 1, further comprising:
   a second clad member that covers a second surface of the optical path on a second side opposite to the first side; and
   a mirror formed by removing a part of the second clad member.

7. An optical unit, comprising:
   an optical waveguide sheet; and
   an optical component mounted on a surface of the optical waveguide sheet,
   wherein the optical waveguide sheet includes:
     an optical path;
     a first clad member that covers a first surface of the optical path on a first side where the optical component is mounted; and
     a mirror, provided on a second side opposite to the first side across the optical path, configured to transmit light from the optical component to the optical path or transmit light from the optical path to the optical component,
     wherein the first clad member has a portion formed by removing a part of the first clad member which does not underlay the optical component and is provided within an area which is unused for propagation of light input to and output from the optical component.

8. The optical unit according to claim 7, wherein the portion is formed by removing the part of the first clad member to an extent that a position of the optical path is recognizable.

9. The optical unit according to claim 7, wherein the portion is formed by removing the part of the first clad member and a part of the optical path.

10. The optical unit according to claim 7, wherein the portion is formed by removing the first part of the clad member along a direction orthogonal to the optical path.

11. The optical unit according to claim 7, wherein the mirror is formed after the optical component is mounted.

12. The optical unit according to claim 7, wherein the optical waveguide sheet includes:
   a second clad member that covers a second surface of the optical path on a second side opposite to the first side; and
   a mirror formed by removing a part of the second clad member.

13. A method for manufacturing an optical unit, comprising:
   determining, in a first surface of an optical waveguide sheet on which an optical component is to be mounted, a mount position of the optical component with respect to a reference position of an optical path, the reference position corresponding to an area which is unused for propagation of light input to and output from the optical component;
   mounting the optical component at the mount position; and
   forming, in a second surface of the optical waveguide sheet opposite to the first surface, a mirror configured to transmit light from the optical component to the optical path and transmit light from the optical path to the optical component.

14. The method according to claim 13, wherein the reference position is recognized by removing at least a part of a clad member covering the optical path on the first surface.

15. The method according to claim 13, wherein the reference position is recognized by removing at least a part of a clad member and exposing the optical path.

16. The method according to claim 15, wherein the part of the clad member is removed along a direction orthogonal to the optical path.

17. The method according to claim 13, wherein a position away from the reference position toward the optical path by a distance is determined as the mount position of the optical component.

18. The method according to claim 13, wherein the reference position is formed by removing a part of a first clad member provided on the side of the first surface of the optical waveguide sheet and the mirror is formed by removing a part of a second clad member provided on the side of the second surface of the optical waveguide sheet.

* * * * *